(12) United States Patent
Siegel et al.

(10) Patent No.: US 10,085,585 B2
(45) Date of Patent: Oct. 2, 2018

(54) SYSTEM AND METHODS OF IMPROVING THE PERFORMANCE, SAFETY AND ENERGY EFFICIENCY OF A COOKING APPLIANCE

(71) Applicant: RAIN MOUNTAIN, LLC, Rochester, NY (US)

(72) Inventors: Robert Siegel, Rochester, NY (US); Robert Lewandowski, Webster, NY (US)

(73) Assignee: Rain Mountain, LLC, Rochester, NY (US)

( * ) Notice: Subject to any disclaimer, the term of this patent is extended or adjusted under 35 U.S.C. 154(b) by 243 days.

(21) Appl. No.: 14/070,984

(22) Filed: Nov. 4, 2013

(65) Prior Publication Data
US 2014/0234496 A1 Aug. 21, 2014

Related U.S. Application Data

(63) Continuation-in-part of application No. 13/772,902, filed on Feb. 21, 2013.

(51) Int. Cl.
*A47J 27/00* (2006.01)
*F24C 15/10* (2006.01)
*A47J 27/62* (2006.01)
*F23N 1/02* (2006.01)
(Continued)

(52) U.S. Cl.
CPC ............. *A47J 27/62* (2013.01); *F23N 1/022* (2013.01); *F23N 5/003* (2013.01); *F23N 5/242* (2013.01); *F24C 15/105* (2013.01); *F23N 2033/02* (2013.01); *F23N 2041/08* (2013.01); *F24C 15/106* (2013.01)

(58) Field of Classification Search
CPC ........ A47J 27/62; H04B 3/746; F24C 15/105; F24C 15/106; F24C 7/087
USPC .......... 99/331, 333, 337, 338, 325; 219/483, 219/484, 489, 448.12, 462.1, 707, 757; 126/299 R, 299 D
See application file for complete search history.

(56) References Cited

U.S. PATENT DOCUMENTS 4,784,114 A 11/1988 Muckler et al.
5,310,110 A * 5/1994 Akamatsu ............... A47J 27/62
126/39 G
(Continued)

*Primary Examiner* — Reginald L Alexander
(74) *Attorney, Agent, or Firm* — Simpson & Simpson, PLLC

(57) ABSTRACT

System and method for improving the performance, safety, and energy efficiency of a cooking appliance with one or more heating elements operably connected with a burner controller controlling an amount of energy flowing to the one or more heating elements. First, a user or a system controller establishes one or more reference levels. The system controller is operably associated with one or more sensors, which measures levels of one or more emissions generated in the operation of the cooking appliance. Afterwards, the system controller compares the measured levels of the one or more emissions with the reference levels and in response to the measured levels of the emissions exceeding reference levels, sends an activation control signal to the cooking appliance. Then, an energy control mechanism associated with the burner controller adjusts the amount of energy flowing to the heating elements in response to the activation control signal.

20 Claims, 13 Drawing Sheets

(51) Int. Cl.
*F23N 5/00* (2006.01)
*F23N 5/24* (2006.01)

(56) References Cited

U.S. PATENT DOCUMENTS

| | | | |
|---|---|---|---|
| 5,369,253 A * | 11/1994 | Kuwata | F24C 7/087 |
| | | | 219/400 |
| 5,611,327 A * | 3/1997 | Teixeira Filho | F24C 3/124 |
| | | | 126/39 G |
| 6,753,511 B2 * | 6/2004 | Mathews, Jr. | H05B 3/746 |
| | | | 219/492 |
| 6,920,874 B1 | 7/2005 | Siegel | |
| 7,133,739 B2 * | 11/2006 | Williamson | H04N 21/25891 |
| | | | 219/414 |
| 7,866,312 B2 | 1/2011 | Erdmann | |
| 7,923,664 B2 * | 4/2011 | Kruempelmann | F24C 15/2014 |
| | | | 165/200 |
| 8,312,873 B2 | 10/2012 | Gagas et al. | |
| 8,849,430 B2 * | 9/2014 | Elston, III | G04R 20/26 |
| | | | 219/483 |
| 2004/0072535 A1 | 4/2004 | Schneider et al. | |
| 2005/0173404 A1 * | 8/2005 | Benjamin | H01L 21/67103 |
| | | | 219/444.1 |
| 2005/0224069 A1 | 10/2005 | Patil et al. | |
| 2006/0234621 A1 | 10/2006 | Desrochers et al. | |
| 2006/0278216 A1 | 12/2006 | Gagas et al. | |
| 2008/0029081 A1 | 2/2008 | Gagas et al. | |
| 2008/0264269 A1 * | 10/2008 | Sterzel | F24C 7/08 |
| | | | 99/331 |
| 2009/0048714 A1 | 2/2009 | Hanawalt | |
| 2009/0215439 A1 | 8/2009 | Hamilton et al. | |
| 2009/0258331 A1 * | 10/2009 | Do | G09B 21/003 |
| | | | 434/127 |
| 2009/0274805 A1 * | 11/2009 | Schonemann | F24C 7/08 |
| | | | 426/233 |
| 2010/0046766 A1 | 2/2010 | Gregg et al. | |
| 2011/0050428 A1 | 3/2011 | Istoc | |
| 2013/0092032 A1 * | 4/2013 | Cafferty | F24C 7/08 |
| | | | 99/325 |
| 2014/0048293 A1 * | 2/2014 | Luongo | A47J 27/62 |
| | | | 169/65 |
| 2015/0226439 A1 * | 8/2015 | Mikulec | F24C 15/2021 |
| | | | 99/337 |

* cited by examiner

SYSTEM AND METHODS OF IMPROVING THE PERFORMANCE, SAFETY AND ENERGY EFFICIENCY OF A COOKING APPLIANCE

CROSS-REFERENCE TO RELATED APPLICATIONS

This application is a continuation-in-part of U.S. application Ser. No. 13/772,902 INTELLIGENT VENTILATING SAFETY RANGE HOOD CONTROL SYSTEM filed Feb. 21, 2013, which is hereby incorporated by reference.

FIELD OF THE INVENTION

This disclosure relates to the field of cooking in enclosed, inhabited spaces and in particular, in a kitchen where food is being cooked on a stove or another cooking appliance with one or more heating elements.

BACKGROUND OF THE INVENTION

We live in an increasingly connected world, where people are connected to each other and to all kinds of machines in order to access useful information that aids in decision-making. Furthermore, machines talk to other machines to obtain or provide data that could be useful to enhance operation for either or perhaps both machines. New wireless technology and common communication protocols (e.g. internet, bluetooth, NFC, etc.) facilitate such sharing in an easy and affordable manner. Cooking stoves, both gas and electric, are sold and installed without a the presumption that a hood will be present to provide ventilation, despite the fact that the ASME standards for gas stoves, which allow for trace amounts of CO, are based on the assumption that the stoves are vented. However, many are not and even those that are generally use a range hood with a fan that must be switched on manually. Many people do not turn these venting fans on unless there is detectable smoke or odor or if the kitchen becomes excessively hot.

Experts say that American households in general and kitchens in particular are seriously under-ventilated. Many homes are constructed with hoods that do not vent outdoors, and many people do not use their hoods routinely when cooking. They don't like the noise, or the fact that the hoods use extra power and remove conditioned air from the house. When they do use them, they often leave the room and forget to turn them off, which can waste a good deal of additional energy both from the fan itself and the loss of heated or cooled air.

The American Society of Heating, Refrigeration and Air Conditioning Engineers (ASHRAE) issued its Standard 62 which covers residential ventilation that recommends that cooking stoves be serviced by a ventilation hood that vents outdoors. This standard is becoming incorporated into municipal building codes which will lead to a gradual incorporation of hoods and stoves being used in concert.

One reason that automatic range hood controls have not yet been popularized is because designing one that works effectively is difficult. Unlike a household furnace, whose thermostat can effectively control the temperature in the house since it controls the source of the heat, a range hood controller has no control over the source of the heat or the fumes or the steam. Therefore it must react without knowledge of what the stove is doing or whether the heat or smoke it just detected is increasing, decreasing or being produced at a steady rate.

Turning to the subject of cooking, this has been a primarily manual operation throughout most of human history. There are dedicated appliances that can automate the cooking of specific foods, such as popcorn makers, coffee makers and rice cookers. Microwave oven have a number of pre-programmed setting the provide an approximated amount of heat and time to cook certain foods such as baked potatoes.

There are also baking and roasting ovens available with pre-programmed settings and interactive displays to help a user through the process of cooking a roast or baking a cake, changing the temperature levels at predetermined times. The user must tell the oven the approximate weight of the food they want to cook.

But cooking on a stovetop has remained a primarily manual process throughout most of history. As such, it requires constant attention, which in this distracted age, and with an aging population, is increasingly harder to come by. As the result of inattention, pots can boil dry and become damaged, food will overcook or burn, causing food wastage, smoke and other potentially dangerous airborne contaminants and possibly even fire. A system that can reliably monitor food that is cooking on a stovetop and take judicious corrective action, would be a welcome addition to many homes for enhanced health, safety, security, economy, and dining enjoyment.

BRIEF SUMMARY OF THE INVENTION

The disclosure describes an automated cooking system that may consist of an otherwise conventional gas or electric stove, and optionally a ventilating range hood, that may have a shared control system which allows information generated by sensors contained in the stove to be used to enhance the performance of the hood, while, at the same time, information collected by sensors contained in the hood can be used to monitor, oversee, and enhance the cooking process taking place on the stove by controlling the levels of the various burners.

The sensors in the stove can provide indication of which burners or elements are activated and to what energy levels they are turned on.

The sensors in the hood can provide information about the air quality above the stove including any number of parameters such as: temperature, humidity, smoke, as well as the presence of any of a number of hazards such as carbon monoxide or un-combusted gas.

The combined controller, which could reside in either the stove, the hood, or both, may also include the electronic circuits capable of capturing and conditioning the signals from those sensors so as to provide input to a microcontroller, a set of software instructions for one or more microcontrollers to interpret the signals and generate responses by controlling both the ON/OFF state of the fan as well as its speed, and the electric circuitry necessary to drive an electric (AC, DC or EC) fan, as well as to drive actuators that control the (gas or electric) burner levels on the cooktop surface of the stove and in the oven.

The system may also contain some form of user interface which will provide users with a means of selecting certain options regarding system behavior, while also providing information to the user as to the real-time status of the system.

The most basic way in which a combined controller could be used would be to improve the operation of the hood by turning on the hood fan in response to the onset of activity on the stove. A type of automated hood control based solely on the settings of the stove could potentially simplify the process described in application Ser. No. 13/772,902 without the use of sensors, but, since the need for ventilation is a function of numerous factors above and beyond the amount of energy going into the stove or the simple fact that a burner is on, it would provide only an approximate response to the actual need for ventilation. It may still not directly correlate with the need for ventilation, to be able to distinguish, for example, between a pan full of food that is burning and giving off smoke, and a tea kettle that is simply heating up. That means that under certain conditions, too much ventilation may be provided while, at other times there may not be enough.

Still the knowledge of whether the stove is on and what settings are being used can certainly be used advantageously as a way to improve the responsiveness of a smart hood control operation like the one described in the parent application. The disclosure will include methods to enhance the performance of a smart hood in the case where the hood and stove controllers are in communication.

However, once the hood's operational control is combined with that of the stove, it now becomes possible to control the source of the heat or fumes that the hood sensors are detecting. Burners could potentially be turned off or lowered in response to the detection of contaminated air. However, since the heat, smoke and fumes are an indirect result of the cooking process, a sophisticated set of algorithms may be required to monitor, provide oversight and potentially assist in the cooking process, without interfering with it in any detrimental way except when matters of safety become paramount.

The art described herein therefore additionally addresses solutions or enhancements to certain key issues that arise during the cooking process that fall variously under the heading of safety, convenience, operability, environmental variability, food damaged or destroyed by overcooking, wasted energy as well as optimized hood operation.

Opportunities exist for monitoring functions that can be used to intervene when certain foods are in danger of being over cooked or burned, which could not only lead to loss of food, but could also lead to health and safety risks. There is no question that considerable losses occur along both of these lines every year, though they might be difficult to quantify.

The disclosure describes a number of ways in which the cooking process can be automated, or semi-automated. These generally may be methods to use information collected by the range hood air quality sensors to affect control measures on the stove that consists of adjustment of burner levels as well as notification to the user and operation of the hood fan. The onset of cooking is best initiated manually by the user, for safety purposes, though the automation could adjust or terminate the cooking process if deemed appropriate along with other, related responses.

So, for example, under general cooking, if the hood sensors detect that food is clearly burning, the offending burners can be automatically turned off, the user notified and the hood fan turned on to an air flow rate that will effectively remove the smoke and contamination from the kitchen.

Some embodiments may provide the user with a set of options regarding the level of intervention desired by the system at any given time. Experienced cooks, for example, will likely prefer less intervention, which they might consider an interference to their creative efforts. Less experienced, or distracted or elderly users might appreciate more intervention. For example, the user could select how they want the system to respond to the detection of smoke under general cooking. For example they could select for the system to 1) simply turn on the fan (if certain foods known to cause smoke are being cooked), 2) turn on the fan and provide some kind of alert signal, such as an audible beep, to catch the user's attention, or 3) turn on the fan, provide a signal and adjust the burner settings to a lower level.

Some embodiments under general cooking may include instructions to turn a burner off in conjunction with a timer. If a certain food needs to be cooked for ten minutes, that information can be entered into the user interface. The system can then cook the food for ten minutes, shutting the burner OFF and sounding an audible signal when the time has elapsed.

Some embodiments may pertain to specific cooking programs, for example, the pasta pre-cooking scenario. If a person wants to cook a pot of pasta, a large pot is filled with water and placed over a high heat. It generally takes a considerable amount of time for the water to come to a boil which is when the pasta needs to be added. Quite often, a busy cook will leave the kitchen, and by the time he or she comes back, a good deal of the water may have boiled out. Some embodiments may apply to any food where the water needs to come to a boil before the food is added. With this method, when a certain burner is identified for pasta cooking, the user may turn the burner onto HIGH. Once the system has detected that the water is boiling, it may produce an audible signal while lowering the heat down to a minimum level, keeping it hot, while minimizing the amount of evaporation while waiting for the user to initiate the next step.

In some embodiments where the food and water are combined at the beginning, the user would add the ingredients, then enter instructions in the UI, telling the system how many minutes the food must cook after it reaches a boil. The user will then turn the burner on HIGH. The system will then do the rest. It will monitor the air above the stove to determine when the pot has come to a boil. At that point, it will reduce the heat to simmer, then after the prescribed amount of time has elapsed, it will turn the burner off and provide an audible signal indicating that the food is done. The system could also provide some "coast" time, shutting the burner off a minute or two earlier to save energy.

Some embodiments, instead of cooking for a prescribed amount of time, will look for air quality "signatures" which indicate that foods like grains that cook by absorbing water, have finished cooking by looking at the amount of moisture being given off.

In some embodiments, a method for improving the performance, safety, and energy efficiency of a cooking appliance with one or more heating elements operably connected with a burner controller controlling an amount of energy flowing to the one or more heating elements, the method comprises:

establishing one or more reference levels via a system controller, enabling said system controller to alert a user or adjust the amount of energy flowing to the one or more heating elements of the cooking appliance, said system controller operably associated with one or more sensors;

operating said one or more sensors for measuring levels of one or more emissions generated in the operation of the cooking appliance;

comparing the measured levels of the one or more emissions with said one or more reference levels;

sending an activation control signal from said system controller to the cooking appliance in response to the measured levels of the one or more emissions exceeding said one or more reference levels; and adjusting the amount of energy flowing to the one or more heating elements of the cooking appliance through an energy control mechanism associated with the burner controller in response to said activation control signal.

In some embodiments, the method further comprises the following steps:

sending information related to the amount of energy flowing to the one or more heating elements of the cooking appliance from the burner controller to said system controller through a communication means;

receiving information on the amount of energy flowing to the one or more heating elements of the cooking appliance via said system controller; and sending an activation control signal from said system controller to the cooking appliance in response to the measured levels of the one or more emissions exceeding said one or more reference levels and in response to said information on the amount of energy flowing to the one or more heating elements of the cooking appliance.

In some embodiments, the method wherein the cooking appliance and said system controller is operably associated with a ventilation apparatus, and further comprises the following steps:

determining a plurality of activation levels associated with one or more fan speeds of the ventilation apparatus by the system controller corresponding to the differences of measured levels of the one or more emissions in comparison to the reference levels;

operating said one or more sensors for measuring levels of one or more emissions generated in the operation of the cooking appliance; and sending an activation control signal from a system controller to the ventilation apparatus and setting the ventilation apparatus at said fan speed associated with said activation level in response to the measured levels of the one or more emissions exceeding said one or more reference levels, said activation control signal associated with said fan speed corresponding to the differences of measured levels of the one or more emissions in comparison to the reference levels.

In some embodiments, the method further comprises the following steps:

sending information related to the amount of energy flowing to the one or more heating elements of the cooking appliance from a communication means associated with the burner controller to said system controller;

receiving information on the amount of energy flowing to the one or more heating elements of the cooking appliance via said system controller; and sending an activation control signal from said system controller to the cooking appliance in response to the measured levels of the one or more emissions exceeding said one or more reference levels and in response to said information on the amount of energy flowing to the one or more heating elements of the cooking appliance.

In some embodiments, the method further comprises the step of determining intervention levels establishing said one or more reference levels required before said system controller sends said activation control signal to the cooking appliance and/or a ventilation apparatus. In some embodiments, the method wherein said intervention levels are communicated by a user through an interface or said intervention levels are associated with a cooking program selection, said intervention levels comprising multiple degrees of responses.

In some embodiments, the method wherein said multiple degrees of responses comprises three degrees of responses:

a first degree response comprising setting the ventilation apparatus at speeds associated with the levels of the one or more emissions;

a second degree response comprising, in addition to said first degree response, displaying a message on a display surface; and a third degree response comprising, in addition to said second degree response, said system controller sending an activation control signal to the cooking appliance to adjust the amount of energy flowing to the one or more heating elements of the cooking appliance through an energy control mechanism associated with the burner controller in response to said activation control signal.

In some embodiments, the method for a cooking recipe is associated with solid food and water, wherein the solid food is not added until the water boils, the method comprising the following steps by a user:

selecting a cooking program selection associated with the cooking recipe wherein the solid food is not added until the water boils; and setting the burner controller on high; and further comprising the following steps:

in response to the measured levels of the one or more emissions exceeding said one or more reference levels indicating boiling of the water, said system controller executing one of the following responses:

setting the ventilation apparatus at speeds associated with the measured levels of the one or more emissions;

displaying a message on a display surface;

sounding an alarm indicating that it is time to add the solid food;

decreasing the amount of energy flowing to the one or more heating elements of the cooking appliance in response to said activation control signal, allowing said water to stay hot while minimizing evaporation;

displaying a message on a display surface; or sounding an alarm;

prompting the user to set a timer;

increasing the amount of energy flowing to the one or more heating elements to an appropriate level for the cooking recipe; and in response to said timer finishing, said system controller executing one of the following responses:

setting the ventilation apparatus at speeds associated with the measured levels of the one or more emissions;

decreasing the amount of energy flowing to the one or more heating elements of the cooking appliance in response to said activation control signal, allowing the water to cool down;

displaying a message on a display surface indicating that the food is ready; or sounding an alarm.

In some embodiments, the method for a cooking recipe is associated with solid food and water, wherein the solid food is added to the water before boiling, the method comprising the following steps by a user:

selecting a cooking program selection associated with the cooking recipe wherein the solid food is not added until the water boils;

setting the burner controller on high; and setting a timer associated with a time period for the solid food and the water to cook after boiling; and further comprising the following steps:

in response to a point at which the measured levels of the one or more emissions exceeding said one or more reference levels indicating boiling of the water, said system controller decreasing the amount of energy flowing to the one or more heating elements of the cooking appliance by means of said activation control signal, allowing said water to simmer;

starting the timer from said point; and in response to said timer finishing, said system controller executing one or more of the following responses:

setting the ventilation apparatus at speeds associated with the measured levels of the one or more emissions;

decreasing the amount of energy flowing to the one or more heating elements of the cooking appliance in response to said activation control signal, allowing the water to cool down;

displaying a message on a display surface indicating that the food is ready; or sounding an alarm.

In some embodiments, the method wherein the cooking appliance comprises an oven operably connected to a burner controller and a temperature sensor, said system controller decreasing the amount of energy flowing to said oven in response to a temperature reading of said temperature sensor exceeding a set temperature safety level by more than an incremental amount. In some embodiments, the method wherein the ventilation apparatus further comprises a smoke or gas sensor, said system controller associated with the ventilation apparatus decreasing the amount of energy flowing to said oven in response to the measured levels of the one or more emissions exceeding said one or more reference levels.

In some embodiments, the method for a cooking recipe for solid food that has audible or humidity emission levels indicating cooking and lower audible or humidity emission levels when cooking is completed, the method comprises the following steps:

setting the burner controller at an appropriate cooking level;

operating a sensor in association with said system controller for sensing levels of said audible emission level generated in the operation of the cooking appliance;

in response to said audible emission level falling below said one or more reference levels indicating cooking, said system controller decreasing the amount of energy flowing to the one or more heating elements by means of said activation control signal;

and further comprising one or more of the following steps:

setting the ventilation apparatus at speeds associated with the measured levels of the one or more emissions;

displaying a message on a display surface; or sounding an alarm.

In some embodiments, the method further comprising communicating a set of instructions for a prescribed cooking sequence to the cooking appliance via said system controller. In some embodiments, the method wherein said set of instructions for a prescribed cooking sequence is associated with a bar code or another product identification code on a cooking package. In some embodiments, the method wherein a device equipped with a product identification code reader communicates said set of instructions for a prescribed cooking sequence.

In some embodiments, a system for improving the performance, safety, and energy efficiency of a cooking appliance with one or more heating elements operably connected with a burner controller controlling an amount of energy flowing to the one or more heating elements, the system comprises:

a means for establishing one or more reference levels via a system controller, enabling said system controller to alert a user or adjust the amount of energy flowing to the one or more heating elements of the cooking appliance;

one or more sensors operably associated with said system controller for measuring levels of one or more emissions generated in the operation of the cooking appliance;

said system controller for operating in association with the cooking appliance, said system controller comprising means for reading said one or more reference levels and comparing the measured levels of the one or more emissions with said one or more reference levels; and an actuator in association with said system controller and operably connected to said burner controller of the cooking appliance, said actuator for adjusting said burner controller of the cooking appliance in response to the measured levels of the one or more emissions exceeding one more reference levels.

In some embodiments, the method wherein the cooking appliance and said system controller is operably associated with a ventilation apparatus.

In some embodiments, a method for configuring a system for improving the performance, safety, and energy efficiency of a cooking appliance with one or more heating elements operably connected with a burner controller controlling an amount of energy flowing to the one or more heating elements, the method comprises:

providing a burner controller for capable of responding to electronic signals for controlling the amount of energy flowing to the one or more heating elements of the cooking appliance;

providing a means for establishing one or more reference levels via a system controller, enabling said system controller to alert a user or adjust the amount of energy flowing to the one or more heating elements of the cooking appliance;

providing one or more sensors operably associated with said system controller to sense levels of one or more emissions generated in the operation of the cooking appliance;

providing said system controller for operating in association with the cooking appliance, said system controller comprising means for reading said one or more reference levels and comparing the measured levels of the one or more emissions with said one or more reference levels; and further providing an actuator in association with said system controller and operably connected to said burner controller of the cooking appliance, said actuator for adjusting said burner controller of the cooking appliance in response to the measured levels of the one or more emissions exceeding one more reference levels.

In some embodiments, the system of claim 16, said burner controller capable of responding to electronic signals comprising:

a control body controlling the amount of energy flowing to the one or more heating elements of the cooking appliance;

a shaft rotating said control body;

a user control connected to said shaft, said user control operably associated with said control body; and a motor turning the control body through a clutch bearing, said clutch bearing allowing the motor to drive said control body in a direction that decreases the amount of energy flowing to the one or more heating elements of the cooking appliance.

In some embodiments, the system, said burner controller comprises:

a sensing means to detect the shaft position or otherwise sense the amount of energy flowing to the one or more heating elements of the cooking appliance; and a communication means for transmitting said information related to the amount of energy flowing to the one or more heating elements of the cooking appliance to said system controller.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of any claims filed later.

BRIEF DESCRIPTIONS OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein: Reference now should be made to the drawings, in which the same reference numbers are used throughout the different figures to designate the same components.

Figure 5:
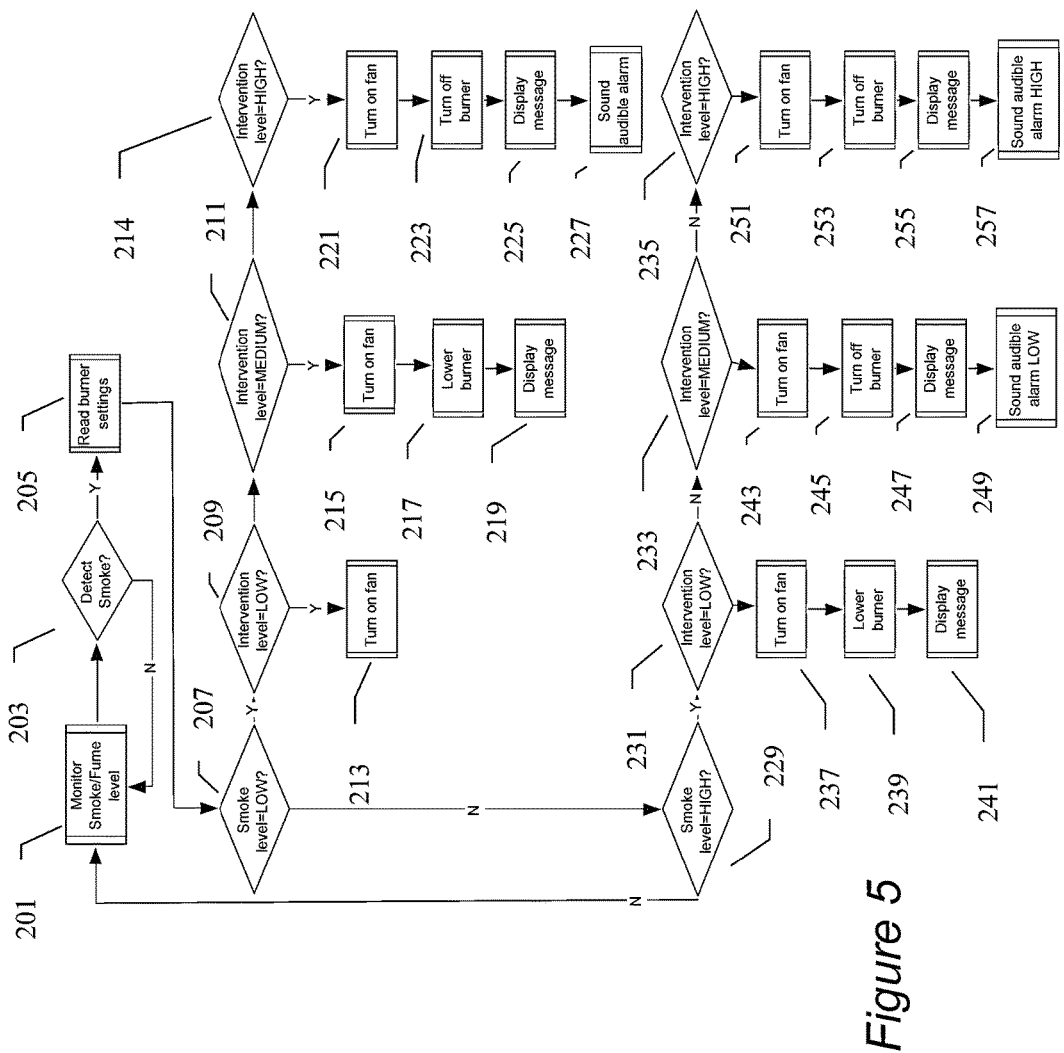
Figure 6:
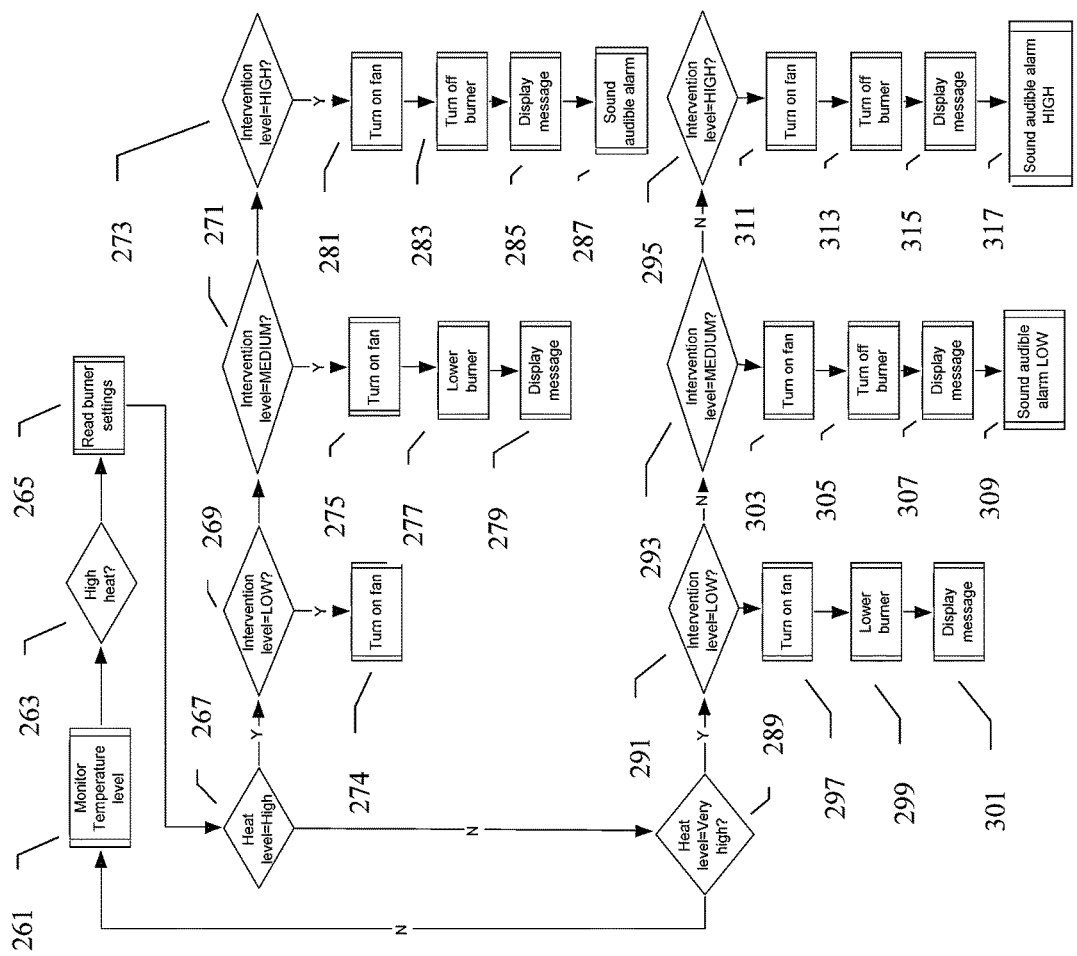
Figure 7:
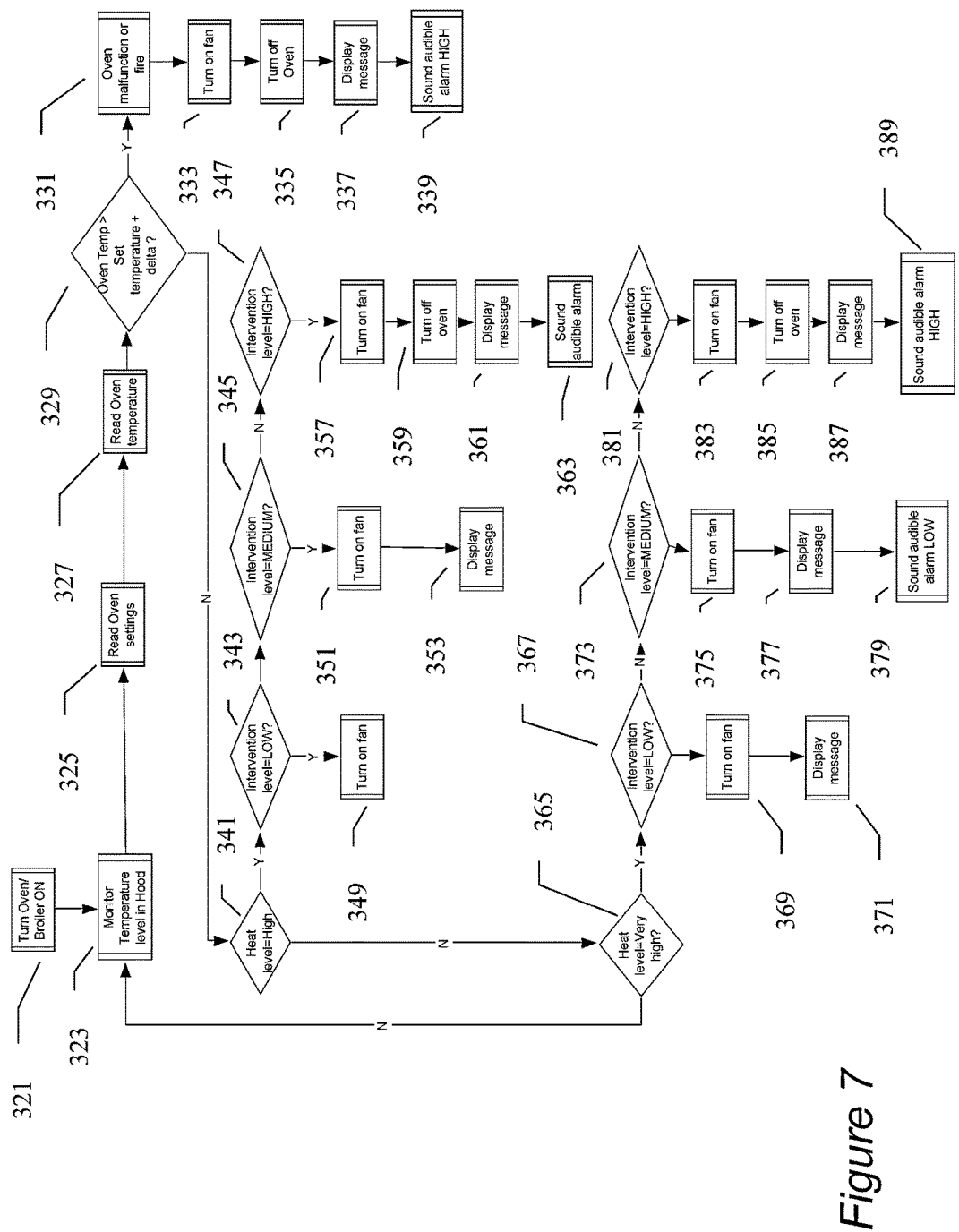
Figure 8:
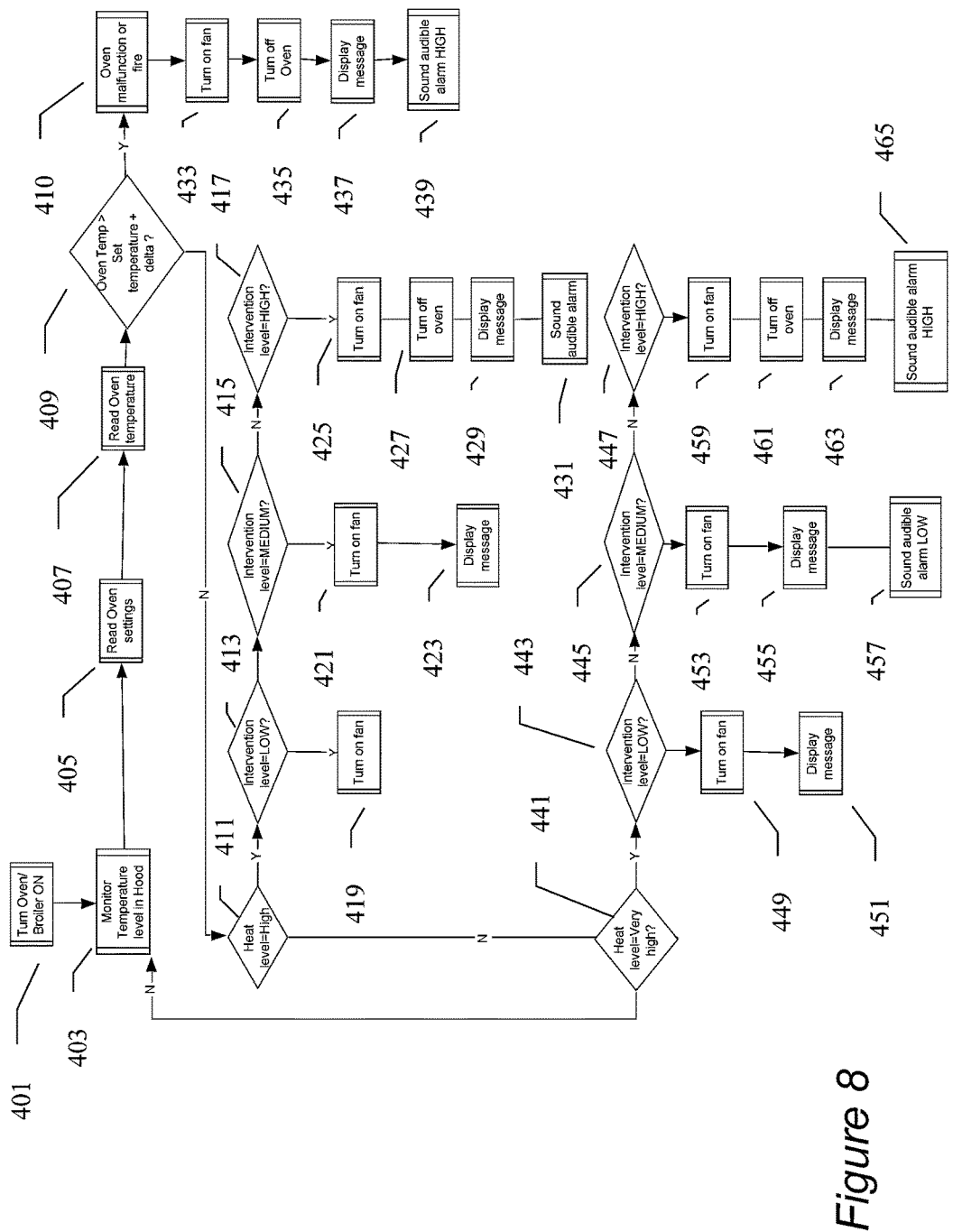
Figure 9:
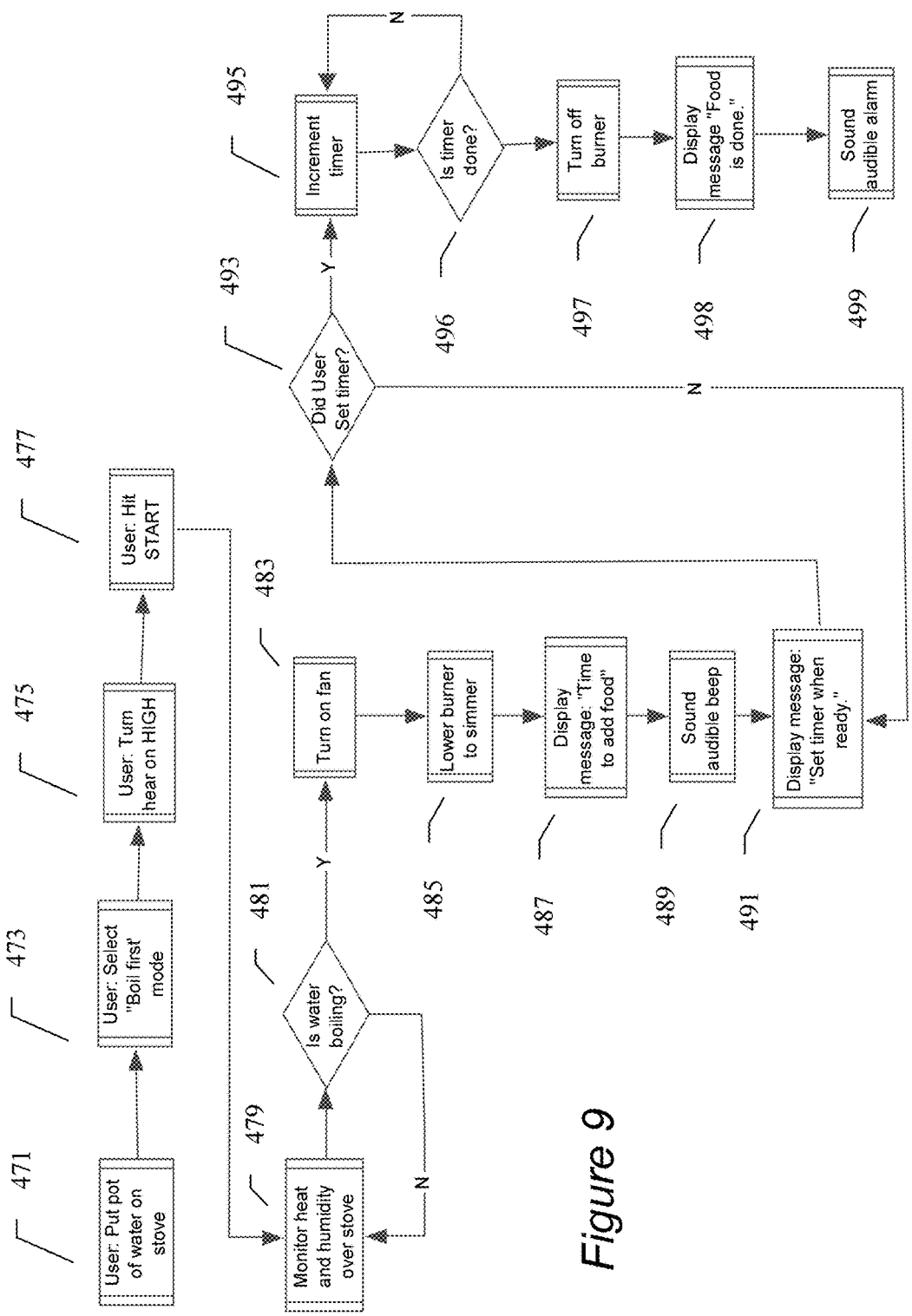
Figure 10:
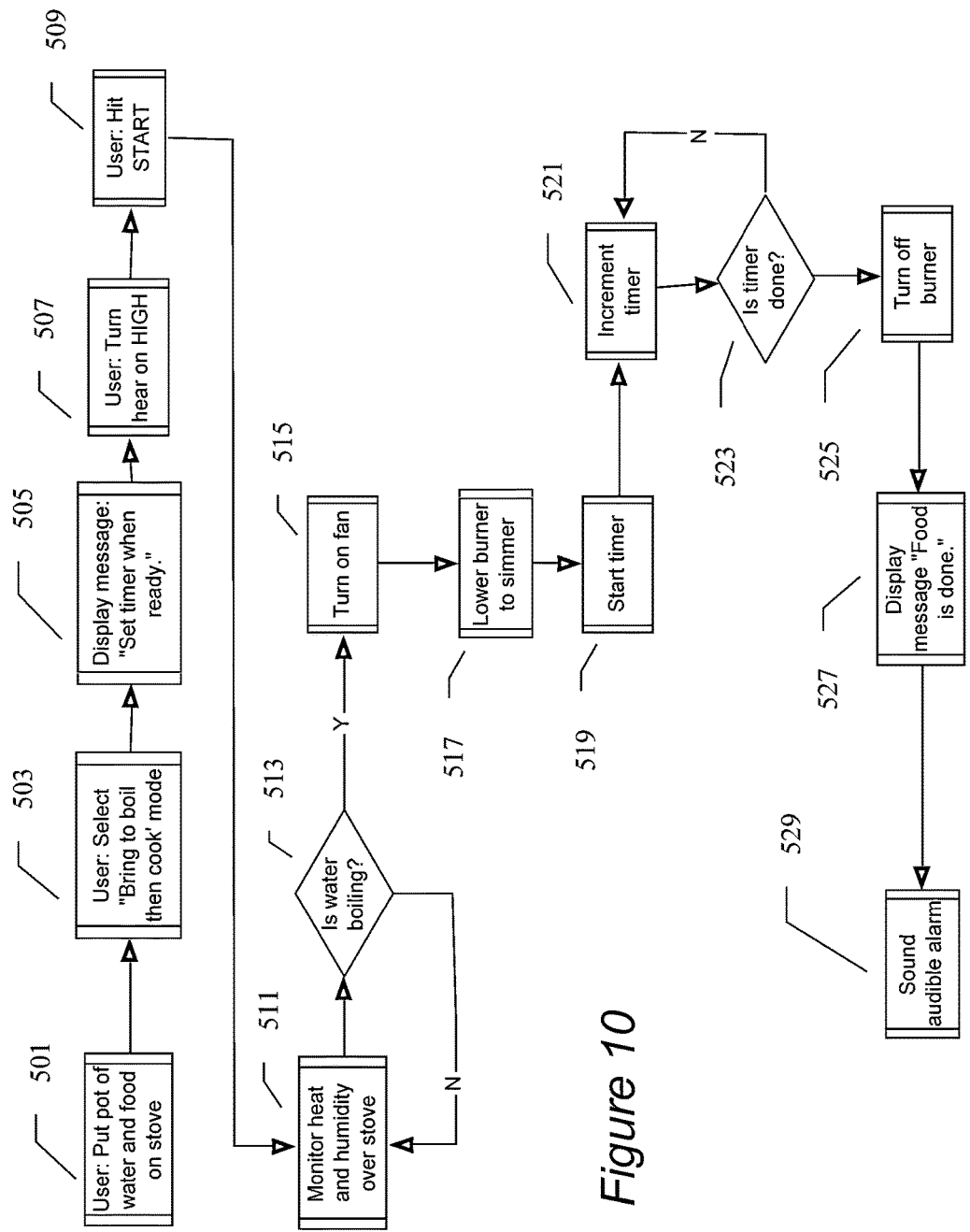
Figure 11:
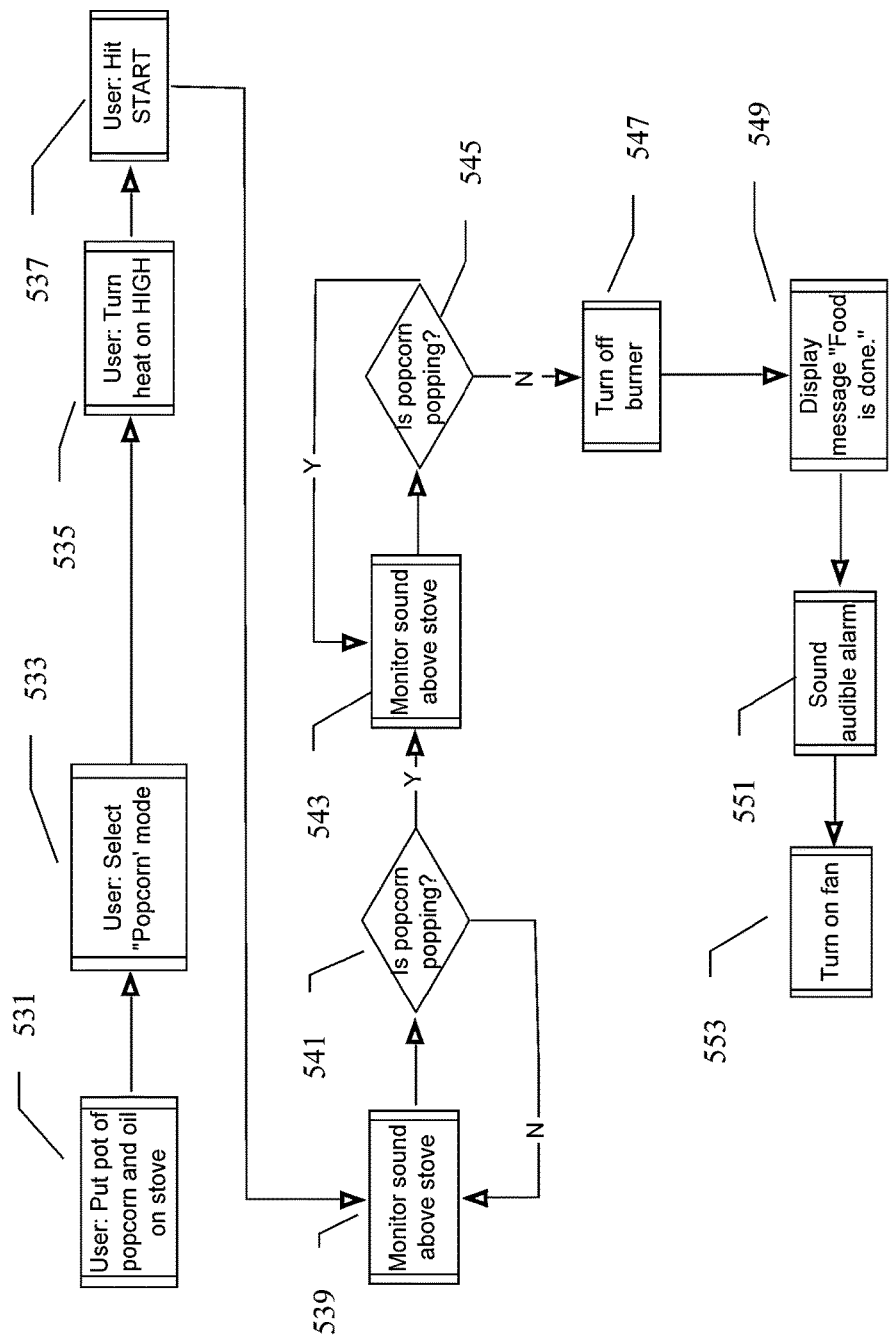
Figure 12:
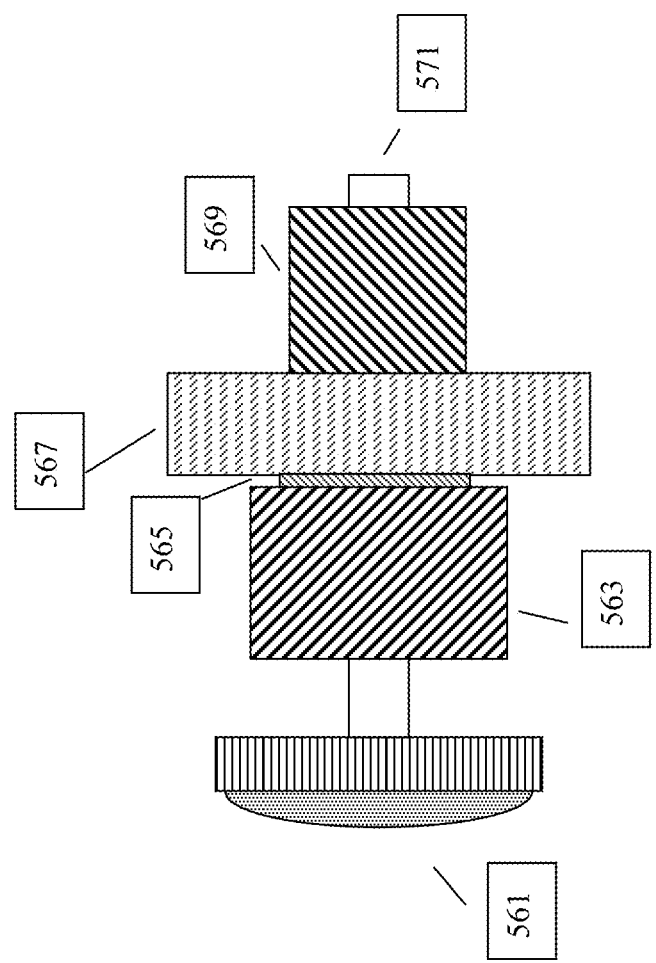
Figure 13:
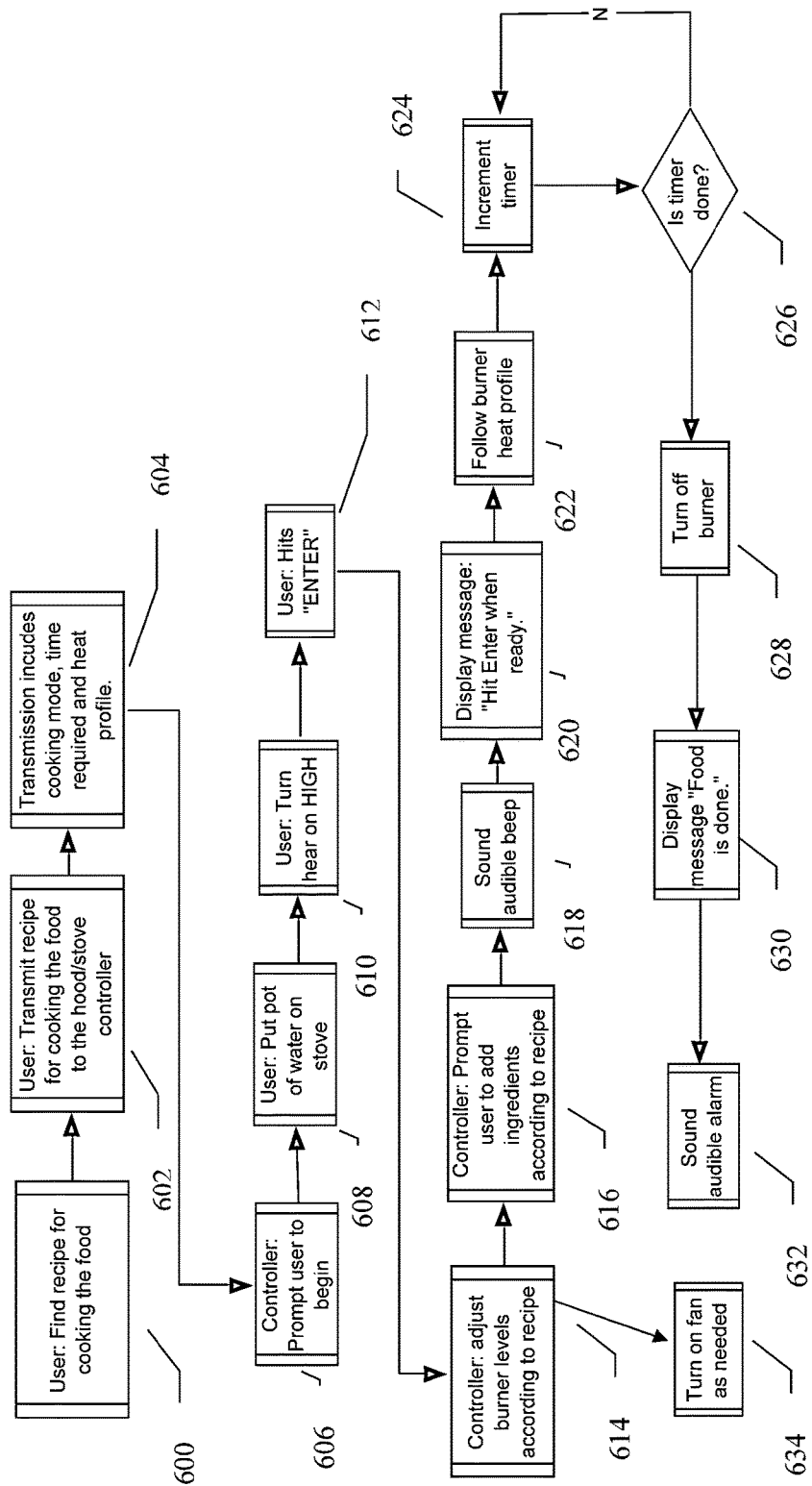

FIG. 5 is a flowchart of the general cooking operation in the case of smoke being detected FIG. 6 is a flowchart of the general cooking operation in the case of heat being detected FIG. 7 is a flowchart of the general cooking operation for oven/broiler operation in response to heat FIG. 8 is a flowchart of the general cooking operation for oven/broiler operation in response to smoke FIG. 9 is a flowchart for the special "boil first then simmer" program for cooking foods like pasta where the food is not added until the water boils FIG. 10 is a flowchart for the special program for cooking foods like grains where the food is added to the water before boiling FIG. 11 is flowchart for the special program for cooking popcorn FIG. 12 is a detail of a specially modified burner control FIG. 13 is a flowchart for the use of a wireless device to program the hood/stove combination with a cooking recipe.

DETAILED DESCRIPTION OF ILLUSTRATIVE EMBODIMENTS

Figure 1:
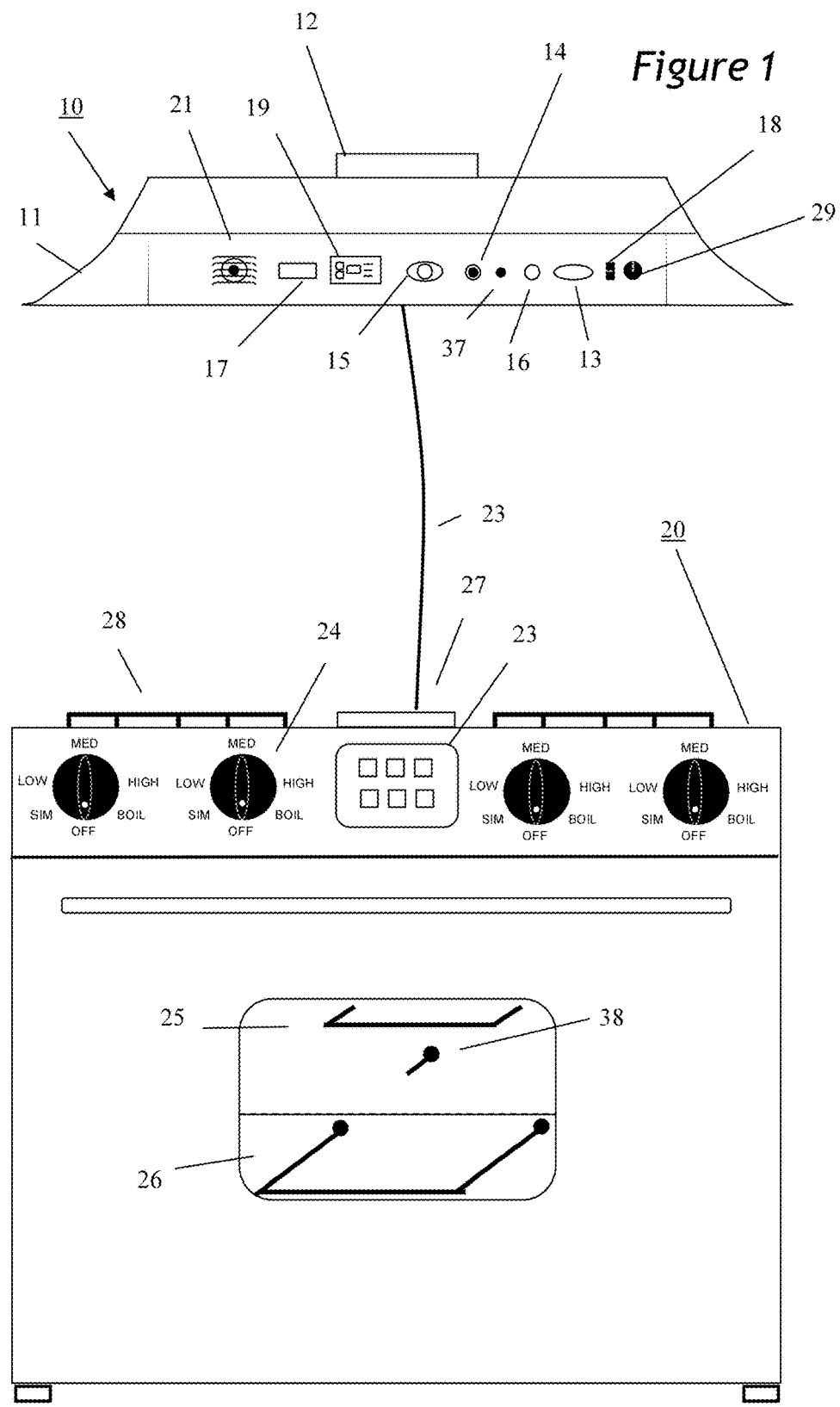
FIG. 1 is an elevation view of a system consisting of a stove and a control/sensor module that is incorporated into a range hood FIG. 2 elevation view of a system consisting of a stove and a control/sensor module that is not incorporated into a range hood

FIG. 1 shows an integrated system, where a set of sensors has been incorporated into a range hood assembly 10 which is typically, though not always, installed above the stove 20 and may be electrically connected to the stove either by a wire or through a wireless interface. This hood assembly typically includes the hood itself 11, and a fan exhaust outlet 12 which should preferably be vented outdoors. The fan could be contained within the hood itself (internal fan) or located remotely (exterior fan) on a roof or mounted on an exterior wall of the structure in which the stove resides. Electrical controls might include a temperature sensor 13, a smoke sensor 14, a gas sensor 15, a humidity sensor 16, a microphone 37, a controller 17 to receive the sensor signals and transmit appropriate command signals to the fan and to the stove either through a wired 23 or wireless interconnection. Additional controls might include a manual/auto switch 18, and one or more fan speed controls 29. The hood might also contain an audible signal 21 to notify occupants of a hazardous condition or a condition requiring prompt attention and a user interface display 19 that will inform the user as to what actions the system is performing and what state it is in as well as allowing for the user to select various operating modes. This could be a simple LED array with pushbuttons or some type of alpha-numeric display or a touch screen. The sensors are all shown on the front of the hood here for illustrative purposes, though in practice they could easily be embedded in the interior of the hood. The hood controller is connected to the stove 20, which could be either a gas-fired, convection, electric-induction, electric resistance or any type of commonly available stove, either by means of an interconnect cable 23, or through some wireless interface such as, but not limited to, Bluetooth, near-field communication (NFC), or radio frequency (Rf) or IR. The stove typically includes some number of surface burners 28, with a corresponding number of burner controls 22. A rotary-type control is shown, though it could also be a touchpad control, such as those used in microwave ovens or other type of control. Transducers connected to the controls can transmit information relative to the position and setting of each control. These could be rotary encoders, current sensors, gas flow sensors or other type of measurement device. Actuators connected to the burner control can be powered to move the position of the control in order to adjust the amount of energy flowing to the burner. These could be motors or other electromechanical devices or they could be an electronic device like a triac if a push button type control is used. The stove also includes an oven cavity 24, which typically includes baking 26 and broiling 25 elements or burners, a temperature sensor 38 and an oven control 23. A touchpad type control is shown here, though a rotary or other type of control could also be used. Given that there are a large number of available stove configurations including freestanding ranges, drop-in ranges, built-in cook-tops, wall ovens, etc. the term stove 20 is hereinafter used in the generic sense to describe any commonly installed cooking appliance containing some or all of the elements described herein. An integrated stove control system which is the subject of this application also contains a stove controller 27, which receives signals or commands from the hood controller 17, and uses them to enhance the control of the operation of the stove's burners 28, and elements 25, 26 through some type of electronic, electrical or electro-mechanical actuator which will either be included inside the stove controller or attached to the burners and elements themselves. It also gathers information from the transducers about the settings of the various burners on the cooktop as well as the oven elements and the oven temperature that can be used by the stove controller and also transmitted to the hood controller to help tie the hood's operational behavior more closely to the actual state of the stove.

Figure 2:
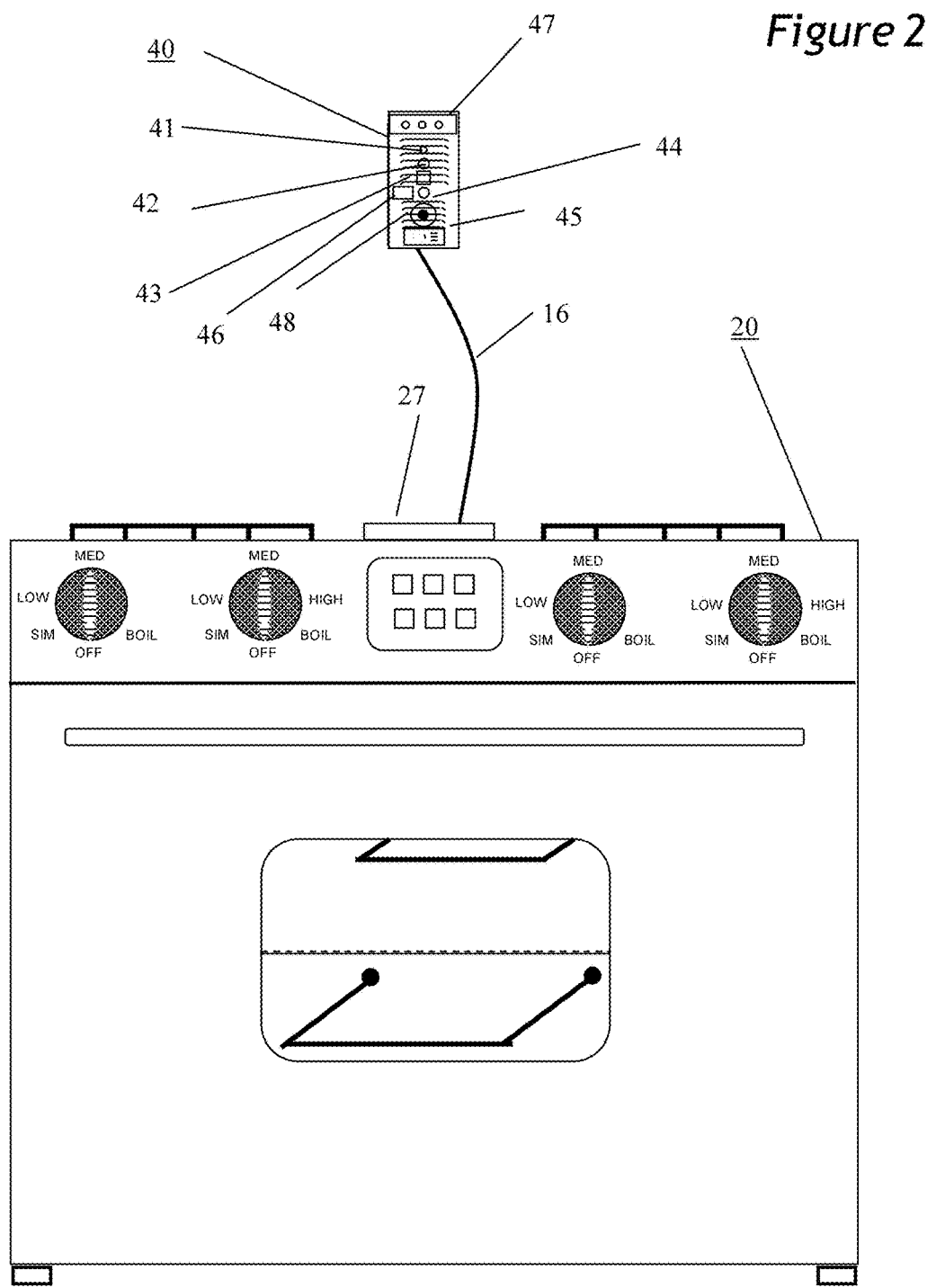

FIG. 2 shows a similar system, only in this case the set of sensors has been incorporated into a sensor module 40 not necessarily associated with a range hood assembly which can be installed above the stove 20 and may be electrically connected to the stove controller 27 either by a wire or through a wireless interface. The sensor module 40, contains a temperature sensor 41, smoke sensor 42, A gas sensor 43, which is sensitive to one or more of the following gases: CO, $CO_2$, natural gas, propane or butane; a humidity sensor 44, and a sensor module controller 46. The sensor module might also contain a user interface consisting of indicator lights 47 or a touch panel display 45, or both, that will inform the user as to what actions the system is performing and what state it is in as well as an alarm buzzer or siren 48, to notify occupants of a hazardous condition or a condition requiring prompt attention.

Figure 3:
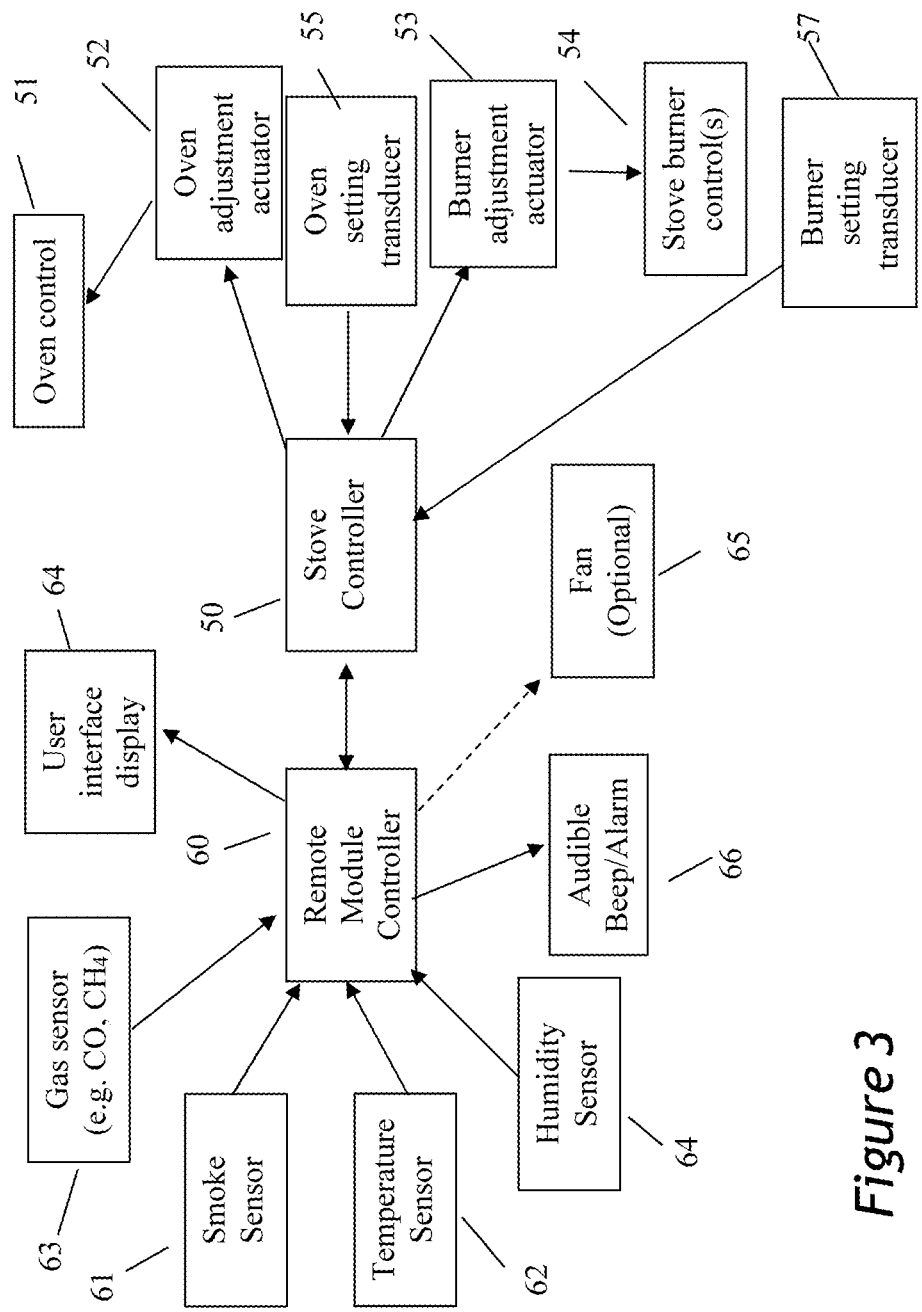
FIG. 3 is a block diagram illustrating the overall control system architecture.

FIG. 3 is a functional schematic which shows the relationship between the various elements of the system. The air quality sensors, which may consist of any of the following: smoke sensor 61, temperature sensor 62, gas sensor 63, or humidity sensor 64, are positioned to sample the air around the installed location with particular regard to whatever emissions might be coming from the stove. These will, in the preferred embodiment, be installed in a ventilating range hood. Their output is continuously monitored by the remote sensor module controller 60. When a level of any of the sensors is detected that exceeds predetermined thresholds, the remote sensor module controller 60, under the control of the system software contained within it, sends a signal to the stove controller 50. The stove controller, then, based on the current state of the stove (e.g. which burners are on at what levels) and the nature of the signal received from the sensor module controller 40 (e.g. was it smoke, temperature, both? etc.) sends an appropriate control signal to the burner controller 54 or oven controller 51 depending on the circumstances. The burner controller 54 then drives the burner actuator 53 to adjust the heat output level. The burner setting transducers 57 (one for each burner) transmits the current state of each burner (On, Off, level, etc.) This can be useful for both stove and hood control operation. Similarly, the oven controller 51, adjusts the appropriate oven burner or element output through the oven adjustment actuator 52. The oven setting transducer 55 can transmit information back to the stove controller about the oven set point and its current temperature. Many stoves today already have electronic oven controls, so this would be nothing new for the oven in question. Although the oven controllers generally do not modulate the heat output of the burner, they simply turn off and on under thermostatic control much as a conventional furnace does. So for the oven, a temperature reduction can only be achieved by lowering the oven set point temperature, which is achieved by turning the burner off until the oven cavity temperature drops to the desired level. Stove-top burner controls on the other hand are continuously adjustable gas valves or electrical potentiometers or variable triacs that are all generally actuated by a shaft that is connected to a rotary knob. These could easily be automated by means of a motorized knob that can be operated either manually or electrically, much in the way that the volume controls on many modern stereo amplifiers or receivers work.

Figure 4:
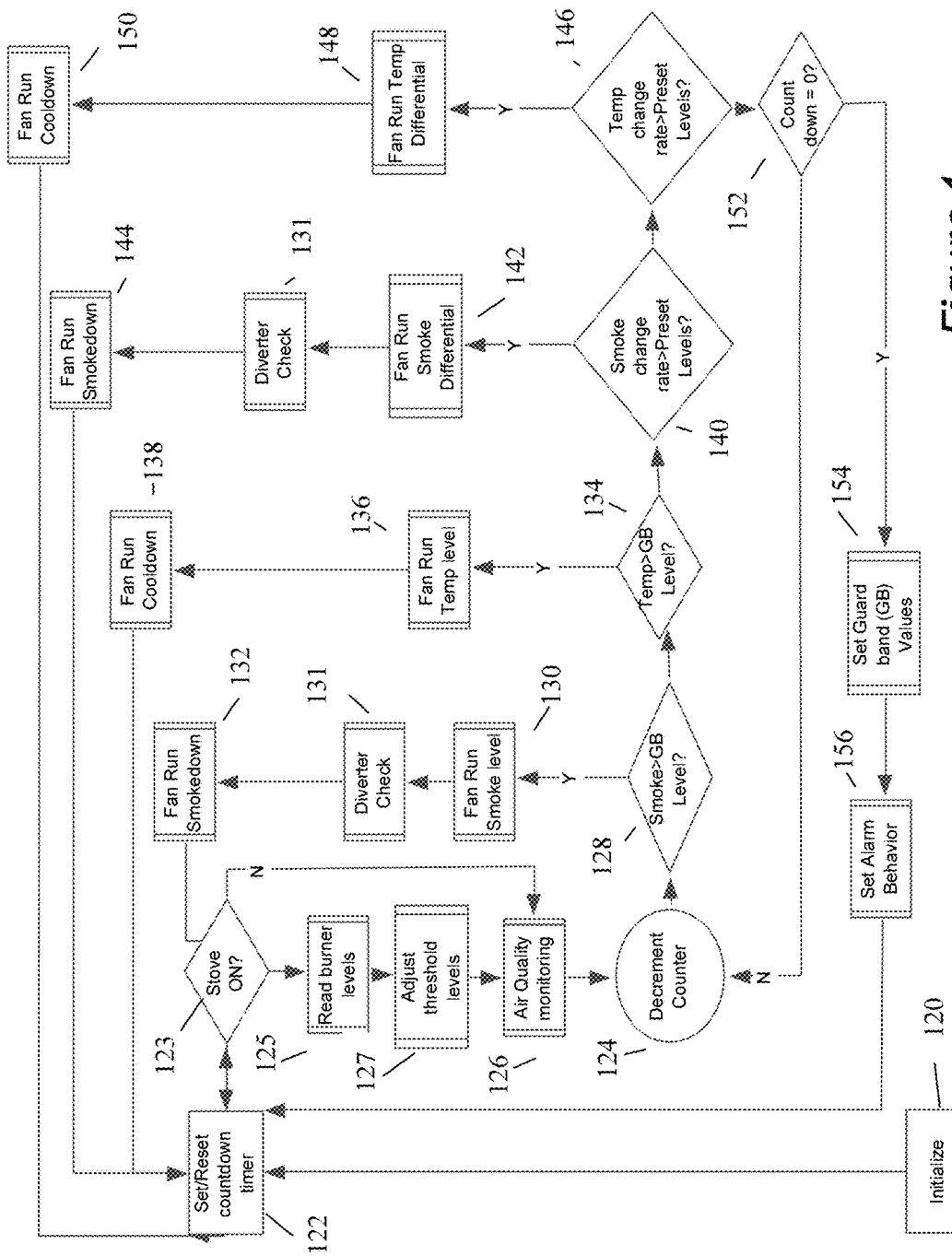
FIG. 4 is a flowchart of the range hood ventilation control logic

FIG. 4 is a flow chart giving a functional overview of one possible embodiment of the software controlling the ventilation function. The program begins at 120 at power up or after a reset when the microprocessor is initialized. At 122 a countdown timer is set which establishes an execution loop. This is followed by the initiation of the "Air Quality Monitoring" program 126. If the stove has been turned ON, 123, as determined by a signal from the stove controller, the burner levels are read 125, a different set of air quality thresholds are loaded into memory 127. This allows different sensitivity levels to be used when it is known that the stove is ON and at what level. The program proceeds through the loop, checking the sensors, and decrementing the counter at 124. If, at 128 the Smoke Level is measured to be above a preset trigger level, the Fan Run Smoke Level program 130, will run, followed by the Fan Run Smokedown program 132, which brings the system back to the beginning where monitoring can resume. If the smoke level is below a prescribed threshold and a seasonal factor is applied, a diverter 131 could be activated to direct the exhaust back into the kitchen through a filter. Likewise, if the measured temperature exceeds one of the preset temperature thresholds 134, the program will branch to the Fan Run Temp Level 136 followed by the Fan Run Cooldown 138. Each of these programs is described in a separate flow chart. If neither temperature nor smoke levels are detected, the program flow continues to check to the smoke rise rate at 140. This requires checking both a level and an elapsed time as will be described later. If the smoke rise rate exceeds a predetermined threshold, the program Fan Run Smoke Differential 142 is executed. Upon completion, it passes control to the Fan Run Smokedown routine 144. If the smoke rise rate is insufficient to trigger a response, the program moves on to compare the temperature rise rate to a predetermined level 146. If the level is achieved, Fan Run Temp Differential 148 is activated, passes control on to Fan Run Cooldown 150 upon completion. If neither rates nor levels are exceeded, and if the counter has reached zero, 152 control returns to the beginning of the loop at 122 to be repeated. Before repeating the loop it checks the long term rate of change of the sensor values relative to determine if the guard band levels 154 need to be adjusted. Alarm behavior is adjusted at 156.

FIG. 5 is a flowchart of the general cooking operation in the case of smoke or fumes or other chemical hazards being detected. Other chemical hazards could include un-ignited gas, carbon monoxide, radon or other similar hazards that could be emitted from the operation of a stove, or in the kitchen. This program allows for the inclusion of user preferences regarding intervention levels that are communicated by the user through an interface. The interface could be buttons on the front panel, a touch screen on the hood or stove, or remotely via a smartphone, tablet or computer. The preferences could vary for each meal being cooked, so that in the case of cooking smoky food (e.g. bacon, or fried fish) the system would not over-react. Alternatively the preferences could be set on a more permanent basis as in the case of an elderly or disabled occupant, who would want the system to take a more cautious approach towards what could potentially be a dangerous situation. If no intervention level preferences are specified, the system will respond using a set of default assumptions. In operation then, first, the sensors in the hood are monitoring smoke/fume level 201 in the air above the stove. If smoke/fumes, etc. are detected 203 the program reads the burner settings 205. If not, it continues monitoring. If a LOW smoke level is detected 207, the program checks the user's desired intervention level (if present). If the intervention level is LOW 209, the program merely turns on the fan 213 to the appropriate speed as dictated by the smoke level. If, instead the intervention level is set to medium (which would likely be the default condition) the program, in response to a threshold level of smoke detected, would turn on the fan 215, lower the burner output 217 and provide a message 219 through the user interface (UI). Note that the UI could either be on the hood or stove, or it could be remote located via an application that would display it on a smartphone, tablet or computer. If the selected intervention level is HIGH 214, the program will turn on the fan 221, turn OFF the burner 223, provide a message 225 through the user interface (UI), and provide an audible alarm 227 through the UI. Note that the UI could either be on the hood or the stove, or it could be remote located via an application that would display it on a smartphone, tablet or computer.

If, the detected smoke/fume, etc. level is HIGH 231 and the intervention level is LOW 233, the program will turn on the fan 237, lower the burner 239, and display a message 241.

If the intervention level is MEDIUM 233 and the smoke/fume level is HIGH, the program will turn on the fan 243, turn OFF the burner 245, provide a message 247 through the user interface (UI), and provide an audible alarm 249 through the UI at a nominal level.

If the intervention level is HIGH and the smoke/fume level is HIGH 235, the program will turn on the fan 251, turn OFF the burner 253, provide a message 255 through the user interface (UI), and provide an audible alarm 257 through the UI at a high level.

FIG. 6 is a flowchart of the general cooking operation in the case of heat being detected. This program allows for the inclusion of user preferences regarding intervention levels that are communicated by the user through an interface. The interface could be buttons on the front panel, a touch screen on the hood or stove, or remotely via a smartphone, tablet or computer. The preferences could vary for each meal being cooked, so that in the case of cooking hot food (e.g. multiple burners or baking) the system would not over-react. Alternatively the preferences could be set on a more permanent basis as in the case of an elderly or disabled occupant, who would want the system to take a more cautious approach towards what could potentially be a dangerous situation. If no intervention level preferences are specified, the system will respond using a set of default assumptions. In operation then, first, the sensors in the hood are monitoring heat level 261 in the air above the stove. If high heat is detected 263 the program reads the burner settings 265. If not, it continues monitoring. If a HIGH heat level is detected 267, the program checks the user's desired intervention level (if present). If the intervention level is LOW 269, the program merely turns on the fan 274 to the appropriate speed as dictated by the smoke level. If, instead the intervention level is set to MEDIUM 271 (which would likely be the default condition) the program, in response to a threshold level of heat detected, would turn on the fan 275, lower the burner output 277 and provide a message 279 through the user interface (UI). Note that the UI could either be on the hood or the stove, or it could be remote located via an application that would display it on a smartphone, tablet or computer. If the selected intervention level is HIGH 273, the program will turn on the fan 281, turn OFF the burner 283, provide a message 285 through the user interface (UI), and provide an audible alarm 287 through the UI. Note that the UI could either be on the hood or the stove, or it could be remote located via an application that would display it on a smartphone, tablet or computer.

If, the detected heat level is VERY HIGH 289 and the intervention level is LOW 291, the program will turn on the fan 297, lower the burner 299, and display a message 301.

If the intervention level is MEDIUM 293 and the heat level is VERY HIGH, the program will turn on the fan 303, turn OFF the burner 305, provide a message 307 through the user interface (UI), and provide an audible alarm 309 through the UI at a nominal level.

If the intervention level is HIGH 295 and the heat level is VERY HIGH, the program will turn on the fan 311, turn OFF the burner 313, provide a message 315 through the user interface (UI), and provide an audible alarm 317 through the UI at a high level.

FIG. 7 is a flowchart of the general cooking operation for oven/broiler operation in response to heat After the user turns the oven or broiler on 321, the program begins to monitor the sensors 323 above the stove. It then reads the oven settings 325 and the oven's internal temperature 327 as determined by the oven temperature control. IF the oven's internal temperature is higher than the set temperature by more than an incremental amount (delta) 329, the controller considers this an oven malfunction 331 and takes the following actions. First it turns on the fan 333, then it turns off the oven 335, then it displays a message through the UI 337, then it sounds a loud audible alarm 339. If that error condition has not occurred, it checks for a HIGH heat level 341. This program also allows for the inclusion of user preferences regarding intervention levels that are communicated by the user through an interface as described previously. If the intervention level is LOW 343, the program merely turns on the fan 349 to the appropriate speed as dictated by the smoke level. If, instead the intervention level is set to MEDIUM 345 (which would likely be the default condition) the program, in response to a threshold level of heat detected, would turn on the fan 351, and provide a message 353 through the user interface (UI). If the selected intervention level is HIGH 347, the program will turn on the fan 357, turn OFF the oven 359, provide a message 361 through the user interface (UI), and provide an audible alarm 363 through the UI.

If, the detected heat level is VERY HIGH 365 and the intervention level is LOW 367, the program will turn on the fan 369, and display a message 371.

If the intervention level is MEDIUM 373 and the heat level is VERY HIGH, the program will turn on the fan 375, provide a message 377 through the user interface (UI), and provide an audible alarm 379 through the UI at a nominal level.

If the intervention level is HIGH 381 and the heat level is VERY HIGH, the program will turn on the fan 383, turn OFF the oven 385, provide a message 387 through the user interface (UI), and provide an audible alarm 389 through the UI at a high level.

FIG. 8 is a flowchart of the general cooking operation for oven/broiler operation in response to smoke. After the user turns the oven or broiler on 401, the program begins to monitor the sensors 403 above the stove. It then reads the oven settings 405 and the oven's internal temperature 407 as determined by the oven temperature control. IF the oven's internal temperature is higher than the set temperature by more than an incremental amount (delta) 409, the controller considers this an oven malfunction 410 and takes the following actions. First it turns on the fan 433, then it turns off the oven 435, then it displays a message through the UI 437, then it sounds a loud audible alarm 439. If that error condition has not occurred, it checks for a HIGH heat level 411. This program also allows for the inclusion of user preferences regarding intervention levels that are communicated by the user through an interface as described previously. If the intervention level is LOW 413, the program merely turns on the fan 419 to the appropriate speed as dictated by the smoke level. If, instead the intervention level is set to MEDIUM 415 (which would likely be the default condition) the program, in response to a threshold level of heat detected, would turn on the fan 421, and provide a message 423 through the user interface (UI). If the selected intervention level is HIGH 417, the program will turn on the fan 425, turn OFF the oven 427, provide a message 429 through the user interface (UI), and provide an audible alarm 431 through the UI.

If, the detected heat level is VERY HIGH 441 and the intervention level is LOW 443, the program will turn on the fan 449, and display a message 451.

If the intervention level is MEDIUM 445 and the heat level is VERY HIGH, the program will turn on the fan 453, provide a message 455 through the user interface (UI), and provide an audible alarm 457 through the UI at a nominal level.

If the intervention level is HIGH 447 and the heat level is VERY HIGH, the program will turn on the fan 459, turn OFF the oven 461, provide a message 463 through the user interface (UI), and provide an audible alarm 465 through the UI at a high level.

FIG. 9 is a flowchart for the special "boil first then simmer" convenience program for cooking foods like pasta where the food is not added until the water boils. The program senses when the water has boiled, then automatically reduce the heat down to simmer level and notifies the user that it is time to add the food. This frees the user from having to wait for the water to boil before adding the food, turning down the heat and setting the timer. It also shuts the burner off and notifies the user when the time has elapsed. The user begins the sequence by placing a pot filled with water on the stove 471 and selecting the "boil first, then add food" option 473. The user then turns the heat under the pot to HIGH 475, then hits START 477. In an alternative embodiment, the controller could also turn the burner on, though this has safety ramifications. The system then monitors the air above the stove 479, using the embedded sensors, checking to see if the water has boiled 481. This can be done by monitoring a humidity sensor, or watching for a sudden rise in temperature as steam-laden air rapidly escapes from the pot. Once it determines that the water is boiling, it initiates a series of actions including: turn on the fan 483, lower the burner setting to simmer level 485, display a message on the UI indicating that it is time to add food 487, producing an audible signal 489, and displaying a message saying set timer when ready 491. The message might also prompt the user to enter the number of minutes of cooking desired. The program will wait for a pre-determined period for the user to set the timer indicating that he has added the food. Once the timer has been set, the system will begin incrementing the elapsing time interval 495 as the food is cooking. When the total time has elapsed, 496 the system then turns the burner OFF 497, displays a message indicating that the food is done 498 and produces an audible signal 499.

FIG. 10 is a flowchart for the special convenience program for cooking foods like grains where the food is added to the water before boiling. The program senses when the water has boiled, then automatically reduce the heat down to simmer level and begins keeping track of the time from that point on. This frees the user from having to watch the pot and wait for it to boil, then turn down the heat and then set the timer. It also automatically shuts the burner off when the time has elapsed. The user begins the sequence by placing a pot filled with water and food on the stove 501 and selecting the "boil first, then simmer" option 503. The system then displays a message telling the user to set timer when ready 505, prompting him to enter the number of minutes required. The user then turns the heat under the pot to HIGH 505, then hits START 509. In an alternative embodiment, the controller could also turn the burner on, though this has safety ramifications. The system then monitors the air above the stove 511, using the embedded sensors, checking to see if the water has boiled 513. This can be done by monitoring a humidity sensor, or watching for a sudden rise in temperature as steam-laden air rapidly escapes from the pot. It could also display a message indicating that it is waiting for the water to boil. Once it determines that the water is boiling, it initiates a series of actions including: turning on the fan 515, lowering the burner setting to simmer level 517, and then setting the timer 519. It could also display a message indicating that cooking has begun.

At this point, the system will begin incrementing the elapsing time interval 521 as the food is cooking. When the total time has elapsed, 523 the system then turns the burner OFF 525, displays a message indicating that the food is done 527 and produces an audible signal 529.

FIG. 11 is flowchart for the special program for cooking popcorn. The sequence begins with the user putting the pot with popcorn and oil on the stove 531. The user then selects the popcorn program 533 on the user interface. The user then turns the heat on high 535 and hits the start button 537. This system begins monitoring the sound 539 above the hood at this point. It keeps monitoring until it hears the sound 541 of popcorn popping. Once it hears the popcorn, it continues monitoring the sound 543, waiting for the popping to stop. Once the popping has stopped 545, the system performs the following actions: turn off the burner 547, turn on the fan 553, display a message saying that the food is done 549, and produce an audible signal 551.

FIG. 12 shows a possible embodiment of a burner control modified for use in an automated stove-hood combination. A knob 561 is used to manually turn the shaft 571 which rotates the control body 563. The control body contains the means to provide a variable amount of electric current by means of a variable circuit element such as a potentiometer, in the case of an electric stove, or gas, by means of a valve, in the case of a gas stove, to the burner to which it is connected. A motor 567 can also be used to turn the control body and the knob through a clutch bearing 565. The clutch bearing, or one-way clutch allows the motor to only drive the control body lower, while allowing it to be turned higher when being adjusted manually. A transducer 569 such as a shaft encoder is used to transmit the rotational position of the control body back to the control system. The adjustment of the amount of current or gas can also be performed with a panel interface, such as up and down arrow buttons or arrows on a touch screen. In the case of an electric stove, there need not be a rotational device at all. The current control could be done with a triac or similar device which could be driven directly by the control system and provide feedback through a sensing resistor.

FIG. 13 shows a method for programming the hood/stove combination using a computing device such as a smartphone, tablet, computer or other such device equipped with a wireless communications protocol such as Bluetooth. The user finds a recipe 600 for the food he or she plans to cook, by searching the web, scanning a barcode or QC code on the food product package or by other means such as manually entered. Then he transmits the recipe 602 to the hood/stove from his device. The transmission 604 contains the cooking mode (e.g. boil first then add food) and the length of cooking time, as well as any specific heat level profile, (e.g. high heat for three minutes, then simmer for twelve, let sit with heat off for ten more). These instructions are all formatted using a standard protocol. The hood/stove combo then prompts the user 606 to place the pot or pan with the food on the burner and turn it on. The user places the pot or pan on the stove. 608 and turns the heat on HIGH 610 and hits ENTER 612.

The controller then knows which burner is being used. It will follow the instructions embedded in the recipe, adjusting the burner as instructed 614, prompting the user to add ingredients 616 when appropriate using an audible beep 618, waiting for indication that user has taken action 620, following the burner profile instructions 622, using the timer 624 and when the time has elapsed 626 turning the food off 628 when complete. It will then notify the user with an audible signal 632 and a message on the display 630 that the food is ready. Throughout the process it will turn on the fan as needed 634.

What is claimed is:

1. A method for improving the performance, safety, and energy efficiency of a cooking appliance with one or more heating elements operably connected with a burner controller controlling an amount of energy flowing to the one or more heating elements, said controller operably connected to one or more emission sensors located in a ventilation apparatus above the cooking unit and adapted to detect one or more emissions selected from the group of heat, smoke, carbon monoxide, humidity, noise, and combinations thereof, as well as a source of cooking information either internal or connected; the method comprising:
   receiving a selected cooking mode and an intervention level from a user via a system controller;
   establishing one or more emission reference levels for the burner controller and the ventilation apparatus via the system controller based on the selected cooking mode and the intervention level;
   measuring one or more emissions with said one or more sensors generated in the operation of the cooking appliance;
   comparing measured levels of the one or more emissions with said one or more emission reference levels to detect a condition requiring action or as a measure of cooking progress;
   sending an activation control signal from said system controller as directed by one or more cooking control algorithms to the cooking appliance based on the cooking mode and the intervention level; and
   adjusting the amount of energy flowing to the one or more heating elements of the cooking appliance through an energy control mechanism associated with the burner controller in response to said activation control signal, wherein the amount of energy is continuously adjustable between a first amount corresponding to a fully on level and a second amount corresponding to a fully off level.

2. The method of claim 1, further comprising the following steps:
   sending information related to the amount of energy flowing to the one or more heating elements of the cooking appliance from the burner controller to said system controller through a communication means;
   receiving information on the amount of energy flowing to the one or more heating elements of the cooking appliance via said system controller; and
   sending an activation control signal from said system controller to the cooking appliance in response to the measured levels of the one or more emissions exceeding said one or more reference levels, as well as other cooking information, if available, from an internal or connected source, and in response to said information on the amount of energy flowing to the one or more heating elements of the cooking appliance and enabling said system controller to notify a user of current conditions, cooking progress and actions required and actions being taken as well as providing the user the ability to select from a variety of cooking modes.

3. The method of claim 1, wherein the cooking appliance and said system controller operably associated with a ventilation apparatus, and further comprising the following steps:
   determining a plurality of activation levels associated with one or more fan speeds of the ventilation apparatus by the system controller corresponding to the differences of measured levels of the one or more emissions in comparison to the reference levels;
   operating said one or more sensors for measuring levels of one or more emissions generated in the operation of the cooking appliance; and
   sending an activation control signal from a system controller to the ventilation apparatus and setting the ventilation apparatus at said fan speed associated with said activation level in response to the measured levels of the one or more emissions exceeding said one or more reference levels, said activation control signal associated with said fan speed corresponding to the differences of measured levels of the one or more emissions in comparison to the reference levels.

4. The method of claim 1, further comprising the following steps:
   sending information related to the amount of energy flowing to the one or more heating elements of the cooking appliance from a communication means associated with the burner controller to said system controller;
   receiving information on the amount of energy flowing to the one or more heating elements of the cooking appliance via said system controller; and
   sending an activation control signal from said system controller to the cooking appliance in response to the measured levels of the one or more emissions exceeding said one or more reference levels and in response to said information on the amount of energy flowing to the one or more heating elements of the cooking appliance.

5. The method of claim 3, further comprising the step of determining user-selected intervention levels in establishing said one or more reference levels required before said system controller sends said activation control signal to the cooking appliance and/or a ventilation apparatus.

6. The method of claim 5, wherein said intervention levels are communicated by a user through an interface or said intervention levels are associated with a cooking program selection, said intervention levels comprising multiple degrees of responses.

7. The method of claim 6, wherein said multiple degrees of responses comprising three degrees of responses:
   a first degree response comprising setting the ventilation apparatus at speeds associated with the levels of the one or more emissions;
   a second degree response comprising, in addition to said first degree response, displaying a message on a display surface; and
   a third degree response comprising, in addition to said second degree response, said system controller sending an activation control signal to the cooking appliance to adjust the amount of energy flowing to the one or more heating elements of the cooking appliance through an energy control mechanism associated with the burner controller in response to said activation control signal.

8. The method of claim 6 for where the cooking program provides an assisted cooking mode associated with solid food and water, wherein the solid food is not added until the water boils, the method comprising the following steps by a user:
selecting a cooking program selection associated with the cooking recipe wherein the solid food is not added until the water boils; and setting the burner controller on high; and
further comprising the following steps:
in response to the measured levels of the one or more emissions exceeding said one or more reference levels indicating boiling of the water, said system controller executing one of the following responses:
setting the ventilation apparatus at speeds associated with the measured levels of the one or more emissions; displaying a message on a display surface;
sounding an alarm indicating that it is time to add the solid food;
decreasing the amount of energy flowing to the one or more heating elements of the cooking appliance in response to said activation control signal, allowing said water to stay hot while minimizing evaporation; displaying a message on a display surface; or
sounding an alarm;
prompting the user to set a timer;
increasing the amount of energy flowing to the one or more heating elements to an appropriate level for the cooking recipe; and
in response to said timer finishing, said system controller executing one of the following responses:
setting the ventilation apparatus at speeds associated with the measured levels of the one or more emissions;
decreasing the amount of energy flowing to the one or more heating elements of the cooking appliance in response to said activation control signal, allowing the water to cool down;
displaying a message on a display surface indicating that the food is ready; or
sounding an alarm.

9. The method of claim 6 where the cooking program provides an assisted cooking mode associated with solid food and water, wherein the solid food is added to the water before boiling, the method comprising the following steps by a user:
selecting a cooking program selection associated with the cooking recipe wherein the solid food is not added until the water boils;
setting the burner controller on high; and
setting a timer associated with a time period for the solid food and the water to cook after boiling; and
further comprising the following steps:
in response to a point at which the measured levels of the one or more emissions exceeding said one or more reference levels indicating boiling of the water, said system controller decreasing the amount of energy flowing to the one or more heating elements of the cooking appliance by means of said activation control signal, allowing said water to simmer;
starting the timer from said point; and
in response to said timer finishing, said system controller executing one or more of the following responses:
setting the ventilation apparatus at speeds associated with the measured levels of the one or more emissions;
decreasing the amount of energy flowing to the one or more heating elements of the cooking appliance in response to said activation control signal, allowing the water to cool down;
displaying a message on a display surface indicating that the food is ready; or
sounding an alarm.

10. The method of claim 1, wherein the cooking appliance comprising
an oven operably connected to a burner controller and a temperature sensor, located in said appliance or remotely, as in a ventilation appliance above the cooking unit;
said system controller decreasing the amount of energy flowing to said oven in response to a temperature reading of said temperature sensor exceeding a set temperature safety level by more than an incremental amount.

11. The method of claim 10, wherein the ventilation apparatus further comprising
a smoke or gas sensor,
said system controller associated with the ventilation apparatus decreasing the amount of energy flowing to said oven in response to the measured levels of the one or more emissions exceeding said one or more reference levels.

12. The method of claim 6 for where the cooking program provides an assisted cooking mode for solid food that has audible or humidity emission levels indicating cooking and lower audible or humidity emission levels when cooking is completed, the method comprising the following steps:
setting the burner controller at an appropriate cooking level;
operating a sensor located in said appliance or remotely, as in a ventilation appliance above the cooking unit, in association with said system controller for sensing levels of said audible emission level generated in the operation of the cooking appliance;
in response to said audible emission level falling below said one or more reference levels indicating cooking, said system controller decreasing the amount of energy flowing to the one or more heating elements by means of said activation control signal; and
further comprising one or more of the following steps:
setting the ventilation apparatus at speeds associated with the measured levels of the one or more emissions;
displaying a message on a display surface; or
sounding an alarm.

13. The method of claim 1, further comprising
communicating a set of instructions for a prescribed cooking sequence, from an internal or connected source to the cooking appliance via said system controller.

14. The method of claim 13, wherein said set of instructions for a prescribed cooking sequence is associated with a bar code or another product identification code on a food package and read by a bar code reader located in said appliance or remotely, as in a ventilation appliance above the cooking unit.

15. The method of claim 13, wherein a device equipped with a product identification code reader communicates said set of instructions from an internal or connected source for a prescribed cooking sequence.

16. A method for configuring a system for improving the performance, safety, and energy efficiency of a cooking appliance with one or more heating elements operably connected with a burner controller controlling an amount of energy flowing to the one or more heating elements, the method comprising:

provoking a burner controller for capable of responding to electronic signals for controlling the amount of energy flowing to the one or more heating elements of the cooking appliance;

providing a means for establishing one or more reference levels via a system controller, enabling said system controller to alert a user or adjust the amount of energy flowing to the one or more heating elements of the cooking appliance;

providing one or more sensors located in a ventilation appliance above the cooking unit, operably connected to said system controller to sense levels of one or more emissions generated in the operation of the cooking appliance, to detect a condition requiring action or as a measure of cooking progress;

providing said system controller for operating in association with the cooking appliance, said system controller comprising means for reading said one or more reference levels and comparing the measured levels of the one or more emissions with said one or more reference levels;

providing a heat level actuator connected to said system controller and operably connected to said burner controller of the cooking appliance, said actuator for adjusting said burner controller of the cooking appliance in response to the measured levels of the one or more emissions exceeding one more reference levels and as directed by one or more cooking control algorithms, using cooking information from an internal or connected source, and a current state of cooking progress as indicated by the sensors, wherein said burner controller is continuously adjustable between a first amount corresponding to a fully on level and a second amount corresponding to a fully off level; and enabling said system controller to alert a user of current conditions, cooking progress, actions required and actions being taken.

17. A system for improving the performance, safety, and energy efficiency of a cooking appliance with one or more heating elements operably connected with a burner controller controlling an amount of energy flowing to the one or more heating elements, the system comprising:

a means for establishing one or more reference levels via a system controller, enabling said system controller to alert a user or adjust the amount of energy flowing to the one or more heating elements of the cooking appliance;

one or more sensors located in a ventilation appliance above the cooking unit, operably connected to said system controller and adapted for measuring levels of one or more emissions generated in the operation of the cooking appliance;

emission levels being further used to identify the state of progress of food being cooked, said system controller for operating in association with the cooking appliance, said system controller comprising means for accessing cooking information from an internal or connected source;

an actuator connected to said system controller and operably connected to said burner controller of the cooking appliance, said actuator adapted for adjusting said burner controller of the cooking appliance in response to the measured levels of the one or more emissions, and as directed by at least one of: one or more cooking control algorithms, cooking information from an internal or connected source, and a current state of cooking progress as indicated by the one or more sensors, wherein said burner controller is continuously adjustable between a first amount corresponding to a fully on level and a second amount corresponding to a fully off level; and an interface adapted for enabling said system controller to alert a user of current conditions, cooking progress, actions required and actions being taken and adapted for providing a means for the user to select from a variety of assisted cooking modes.

18. The system of claim 17, wherein the cooking appliance and said system controller operably associated with a ventilation apparatus.

19. The system of claim 16, said burner controller capable of responding to electronic signals comprising:

a control body controlling the amount of energy flowing to the one or more heating elements of the cooking appliance;

a shaft rotating said control body;

a user control connected to said shaft, said user control operably associated with said control body; and a motor turning the control body through a clutch bearing, said clutch bearing allowing the motor to drive said control body in a direction that decreases the amount of energy flowing to the one or more heating elements of the cooking appliance.

20. The system of claim 17, said burner controller comprising:

a sensing means to detect the shaft position or otherwise sense the amount of energy flowing to the one or more heating elements of the cooking appliance; and a communication means for transmitting said information related to the amount of energy flowing to the one or more heating elements of the cooking appliance to said system controller.

* * * * *